US006933799B1

(12) United States Patent
Nukaga et al.

(10) Patent No.: US 6,933,799 B1
(45) Date of Patent: Aug. 23, 2005

(54) METHOD OF CONTROLLING INTERMODULATION DISTORTION OF NON-RECIPROCAL DEVICE

(75) Inventors: Masako Nukaga, Chuo-ku (JP); Naoyoshi Sato, Chuo-ku (JP); Sakae Henmi, Chuo-ku (JP)

(73) Assignee: TDK Corporation, Tokyo (JP)

( * ) Notice: Subject to any disclaimer, the term of this patent is extended or adjusted under 35 U.S.C. 154(b) by 1038 days.

(21) Appl. No.: 09/689,696

(22) Filed: Oct. 13, 2000

Related U.S. Application Data

(63) Continuation of application No. PCT/JP99/01996, filed on Jan. 14, 1999.

(30) Foreign Application Priority Data

Apr. 14, 1998 (JP) ........................................... 10-103194
Jan. 26, 1999 (JP) ........................................... 11-17254

(51) Int. Cl.[7] ............................ H01P 1/32; C04B 35/40
(52) U.S. Cl. .................... 333/1.1; 333/24.2; 252/62.57; 252/62.58; 252/62.59; 252/62.63
(58) Field of Search ................................ 333/1.1, 24.2; 252/62.56, 62.57, 62.58, 62.59, 62.63, 62.62

(56) References Cited

U.S. PATENT DOCUMENTS

| | | | | |
|---|---|---|---|---|
| 3,563,898 A | | 2/1971 | Neichi et al. | |
| 4,236,125 A | | 11/1980 | Bernard et al. | 333/1.1 |
| 5,926,073 A | * | 7/1999 | Hasegawa et al. | 333/1.1 |

FOREIGN PATENT DOCUMENTS

| | | |
|---|---|---|
| GB | 1 321 511 | 6/1973 |
| JP | 56-10767 | 3/1981 |
| JP | 56-31288 | 7/1981 |
| JP | 3-288406 | 12/1991 |
| JP | 7-61821 | 3/1995 |
| JP | 7-157313 | 6/1995 |
| JP | 8-288116 | 11/1996 |

OTHER PUBLICATIONS

Y.–S. Wu, et al., IEEE Transactions on Microwave Theory and Techniques, vol. MTT–24, No. 2, pp. 69–77, XP–002229537, "A Study of Nonlinearities and Intermodulation Characteristics of 3–Port Distributed Circulators", Feb. 1976.

M. Nukaga et al., Relationship between the Magnetic Properties of YIG Ferrites and the IMD (Intermodulation Distortion) of an Isolator, Journal of the Applied Magnetics Association of Japan, vol. 22, No. 4–2, (1998), p. 673–676.

International Search Report of PCT/JP99/01996, dated Jul. 1999.

* cited by examiner

*Primary Examiner*—Benny Lee
*Assistant Examiner*—Stephen E. Jones
(74) *Attorney, Agent, or Firm*—Oblon, Spivak, McClelland, Maier & Neustadt, P.C.

(57) ABSTRACT

A non-reciprocal device includes at least one ferrimagnetic member (21 or 22). By controlling the FMR linewidth ΔH of the ferrimagnetic members (21 and 22), intermodulation distortion is controlled.

26 Claims, 7 Drawing Sheets

METHOD OF CONTROLLING INTERMODULATION DISTORTION OF NON-RECIPROCAL DEVICE

This application is a continuation of PCT/JP99/01996 filed Jan. 14, 1999.

TECHNICAL FIELD

The present invention relates to a method of controlling an intermodulation distortion of a non-reciprocal device, ferrimagnetic material suitable for implementing the method, and a non-reciprocal device using the ferrimagnetic material.

BACKGROUND OF THE INVENTION

Worldwide-scale introduction of a 'Code Division Multiple Access (CDMA)' method has recently been pursued in the field of mobile communications being used compact mobile communications device such as cellular phones, personal-handy phones or microcellular phones. In association with such a tendency, an intermodulation distortion (hereinafter called 'IMD') of a non-reciprocal device used in mobile communications, such as an isolator or a circulator, has come to gain attention despite the IMD having thus far posed no problem in a conventional analog communications scheme. The IMO corresponds to an undesired signal which would additionally arise when two or more signals are supplied to a non-linear device, which is used in non-reciprocal device. For instance, when two signals, one having a frequency $f_1$ and the other having a frequency $f_2$, are simultaneously input to a non-reciprocal device, there arise frequency components other than the signals of frequencies $f_1$ and $f_2$ such as a sideband having a frequency of $(2f_1-f_1)$ and a sideband having a frequency of $(2f_2-f_1)$. These sidebands will cause crosstalk or noise. Therefore, sidebands must be suppressed.

The IMD can be suppressed, by applying a sufficiently strong direct current magnetic field (hereinafter called 'd.c. magnetic field' simply) to a ferrimagnetic member (i.e. a member made of ferrimagnetic material) from a magnet provided in a non-reciprocal device. However, application of the d.c. magnetic field involves production of side effects; that is, shifting of a frequency band assigned to a non-reciprocal device toward a higher frequency and narrowing of the frequency band of interest, thus degrading the performance of the non-reciprocal device. Further, demand for a more compact and thinner non-reciprocal device hinders application of a sufficient d.c. magnetic field to the ferrimagnetic member.

The compact mobile communications device is battery-powered, and then, use of a low-loss device is indispensable for realizing long-time operation of the compact mobile communications device. In a case where the compact mobile communications device is equipped with a non-reciprocal device, the compact mobile communications device is also desired to have a low-loss characteristic. Not only a compact mobile communications device serving as a 'Terminal Station' but also an apparatus serving as 'Base Station' provides small coverage areas, and hence an amplifier for use of a small amount of power has been used for the apparatus. Further, a non-reciprocal device to be used as a Base Station is also desired to have a low-loss characteristic.

Also, important characteristics of a ferrimagnetic material used in a non-reciprocal device are to have a characteristic of a sufficiently low ferromagnetic resonance linewidth (hereinafter called 'FMR linewidth' and also represented as '$\Delta H$'), which acts as a magnetic loss term.

In a non-reciprocal device, the ferrimagnetic member is used in combination with a magnet, and hence a saturation magnetic flux density of the ferrimagnetic material forming the ferrimagnetic member is ideal in assuming that a temperature coefficient may compensate for the temperature characteristic of a magnet. A close correspondence exists between the temperature coefficient of the saturation magnetic flux density and curie temperature (hereinafter represented as 'Tc'). Ferrimagnetic material is usually desired to have high curie temperature in response to a magnet which is less susceptible to temperature change.

Japanese Patent Publication No. 31288/1981 (Kokoku 56-31288) describes the technique of arbitrarily changing the value of saturation magnetic flux density, by changing the composition ratio of yttrium-calcium-vanadium-iron garnet ferrite (hereinafter called or represented as 'Y—CaV—Fe garnet ferrite') substituted by indium (In) and aluminum (Al).

However, the above-mentioned material, i.e. the Y—CaV—Fe garnet ferrite, has a curie temperature as low as 160° C. or less. Therefore, a non-reciprocal device formed of the Y—CaV—Fe garnet ferrite encounters a practical problem of the non-reciprocal device being limited to use at a certain temperature or below. Further, In is a rare natural resource, and hence a ferrite containing In would become costly.

DISCLOSURE OF THE INVENTION

Accordingly, the present invention has been aimed at providing—

- an intermodulation distortion control method of enabling reduction of an intermodulation distortion even when a sufficient d.c. magnetic field cannot be applied to magnetic material;
- a ferrimagnetic material suitable for implementing the control method; and
- a non-reciprocal device formed therefrom.

The present invention has also been aimed at providing—

- an intermodulation distortion control method effective for making a non-reciprocal device compact and thin;
- ferrimagnetic material suitable for implementing the intermodulation distortion control method; and
- a non-reciprocal device formed therefrom.

The present invention has further been aimed at providing—

- low-cost ferrimagnetic material having a superior temperature characteristic; and
- a non-reciprocal device formed therefrom.

To these ends, according to the present invention, a ferromagnetic resonance linewidth of ferrimagnetic material contained in a non-reciprocal device is controlled in order to control an intermodulation distortion of the non-reciprocal device. According to this control method, even in a case where a sufficient d.c. magnetic field cannot be applied to the ferrimagnetic member, the intermodulation distortion of the non-reciprocal device can be improved, thereby sufficiently responding to demand for a compact and thinner non-reciprocal device.

BEST MODES FOR WORKING THE INVENTION

Figure 1:
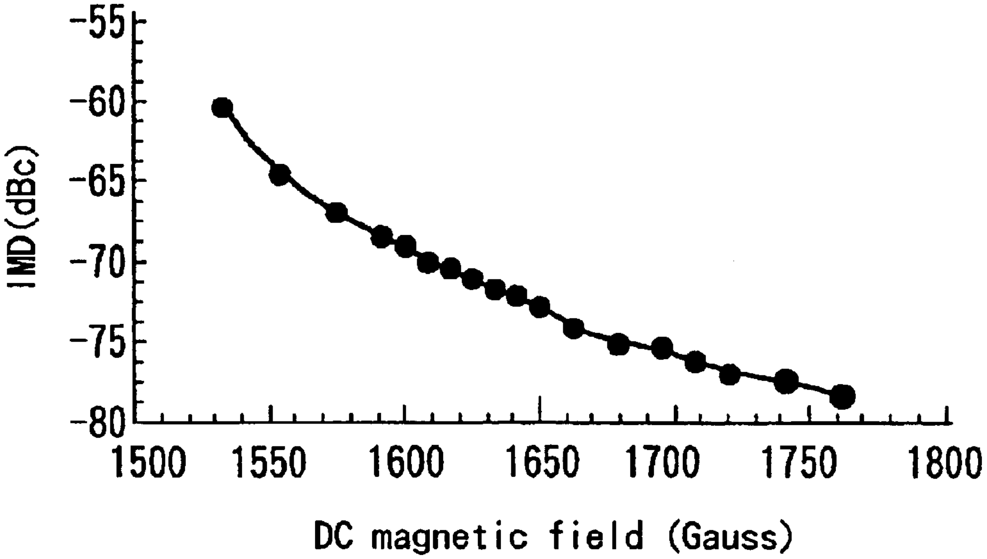
FIG. 1 is a graph showing the relationship between the intensity of a d.c. magnetic field of a magnet used in a non-reciprocal device and an IMD.

A non-reciprocal device comprises ferrimagnetic member and a magnet for applying a d.c. magnetic field thereto. FIG. 1 shows the relationship between the intensity of a d.c. magnetic field applied by a magnet and an IMD. As shown in FIG. 1, the greater the intensity of the d.c. magnetic field applied to the ferrimagnetic member by the magnet, the lower the IMD. Accordingly, generation of an IMD can be suppressed by applying a sufficiently strong d.c. magnetic field to the ferrimagnetic member.

The reason for the above-described effect; that is, the IMD decreasing with increasing intensity of the d.c. magnetic field applied to the ferrimagnetic member by the magnet, is as follows:

In a case where a strong d.c. magnetic field is applied to ferrimagnetic member, the influence of a demagnetizing field developing in the vicinity of a non-magnetic phase in ferrimagnetic material forming the ferrimagnetic member and the influence of a crystalline magnetic anisotropy or a like characteristic are weaker than the influence of the applied magnetic field, wherewith procession motions of spins generating in magnetic material are aligned uniformly into one direction, thus causing a circular motion.

In reality, a decreasing in the operational performance of a non-reciprocal device and demand for a compact and thinner non-reciprocal device hinder application of a sufficient d.c. magnetic field.

In order to solve these problems, the present invention controls an IMD by controlling a FMR linewidth of the ferrimagnetic member or the ferrimagnetic material forming the ferrimagnetic member contained in a non-reciprocal device.

In general, the FMR linewidth of a polycrystal ΔH can be expressed as follows:

$$\Delta H = \Delta Hi + \Delta Hp + \Delta Ha \qquad (1)$$

where,

ΔHi denotes a FMR linewidth of a single crystal of the same composition;

ΔHp denotes an increment contributed from a non-magnetic phase which is present in a sample (hereinafter called 'increment ΔHp' simply); and ΔHa denotes an increment contributed from crystalline magnetic anisotropy (hereinafter called 'increment ΔHa' simply).

A FMR linewidth of a single crystal ΔHi, which is one of the proper values of a single crystal, is said to assume a value of 0.5[Oe], and this linewidth is negligible at the time of discussion of a FMR linewidth of a polycrystal. Next will be described an increment ΔHp (here, especially, the ΔHp denotes an increment contributed from pores) and an increment ΔHa.

<Influence of Demagnetizing Field Developing in the Vicinity of Pores>

With regard to a increment ΔHp, E. Shlomann has provided the following equation (2):

$$\Delta Hp = 1.47(4\pi Ms)p \qquad (2)$$

where "p" designates porosity.

Figure 2:
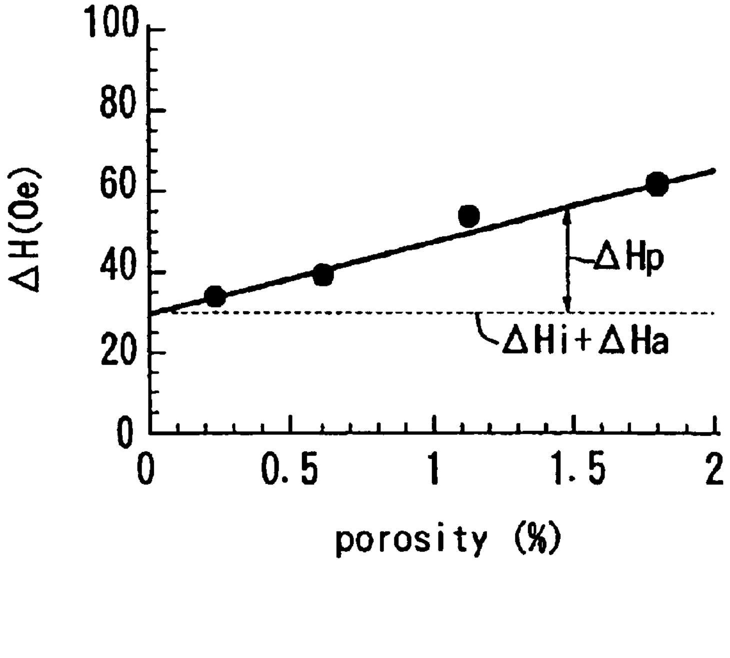
FIG. 2 shows the relationship between the porosity of Y—Al—Fe garnet ferrite and a FMR linewidth $\Delta H$.

FIG. 2 shows a relationship between a porosity p and the FMR linewidth ΔH for yttrium-aluminum-iron garnet ferrite (hereinafter called and also represented as 'Y—Al—Fe garnet ferrite'). A FMR linewidth ΔH obtained at a porosity of 0% corresponds to (ΔHi+ΔHa). Hence, an increment ΔHp is obtained by subtracting (ΔHi+ΔHa) from the FMR linewidth ΔH.

Figure 3:
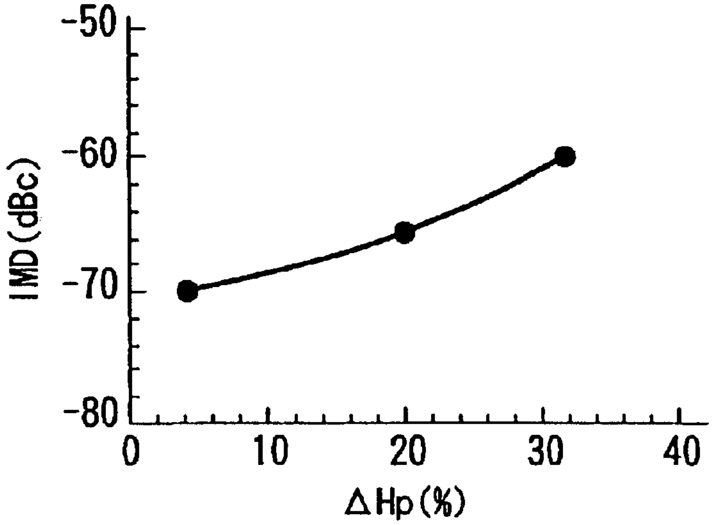
FIG. 3 is a graph showing the relationship between an increment ΔHp and the IMD.

FIG. 3 is a graph showing a relationship between the increment ΔHp and an IMO. The IDM was determined through use of a distributed parameter isolator. Two types of signals; that is, a signal having a frequency of 1960.0 MHz and a signal having a frequency of 1960.1 MHz, were input to the isolator. Input power per wave was set to 36 dBm. Further, the ferrimagnetic member of the isolator was made of Y—Al—Fe garnet ferrite.

As can be seen from FIG. 3, the IMD increases simply with an increase in the increment ΔHp. In other words, the IMD can be controlled by controlling the increment ΔHp.

<Increment ΔHa>

An increment ΔHa is expressed as $$\Delta Ha \propto (K_1)^2/(Ms)^3 \qquad (3)$$

where $K_1$ designates a crystalline magnetic anisotropy constant, and

Ms designates the value of saturation magnetization.

Table 1 shows characteristic values of yttrium-calcium-vanadium-zirconium-iron garnet ferrites (hereinafter called and also represented as 'Y—CaV—Zr—Fe garnet ferrite') employing different amounts of zirconium (Zr) for substitution, on the condition that saturation magnetization is around 1250 Gauss.

TABLE 1

| Composition | 4πMs [Gauss] | Curie Point [° C.] | Porosity [%] | ΔH [Oe] |
|---|---|---|---|---|
| $Y_{2.42}Ca_{0.6}Fe_{4.68}V_{0.2}O_{12}$ | 1243 | 278 | 0.3 | 34 |
| $Y_{2.3}Ca_{0.72}Fe_{4.59}V_{0.33}Z_{0.06}O_{12}$ | 1252 | 264 | 0.3 | 30 |
| $Y_{1.11}Ca_{0.8}Fe_{4.53}V_{0.1}Zr_{0.1}O_{12}$ | 1214 | 259 | 0.3 | 20 |
| $Y_{2.06}Ca_{0.96}Fe_{4.49}V_{0.38}Zr_{0.2}O_{12}$ | 1215 | 233 | 0.3 | less than 10 |

Machida et al. have reported that substitution with Zr is effective for decreasing magnetic anisotropy. In Table 1, all the samples are substantially equal in terms of saturation magnetic flux density and porosity. Provided that porosity assumes a value of 0.3% and saturation magnetic flux density assumes a value of 1250 Gauss, a increment ΔHp assumes a value of about 6[Oe] according to the above-mentioned equation (2). All the samples are equal and assume a contribution of about 6[Oe]. Accordingly, a difference of each FMR linewidth ΔH among the samples provided in Table 1 can be considered to be attributable to a difference in ΔHa terms of the samples, the difference having been caused by variation in magnetic anisotropy resulting from a difference in the amounts of Zr used for substitution.

Figure 4:
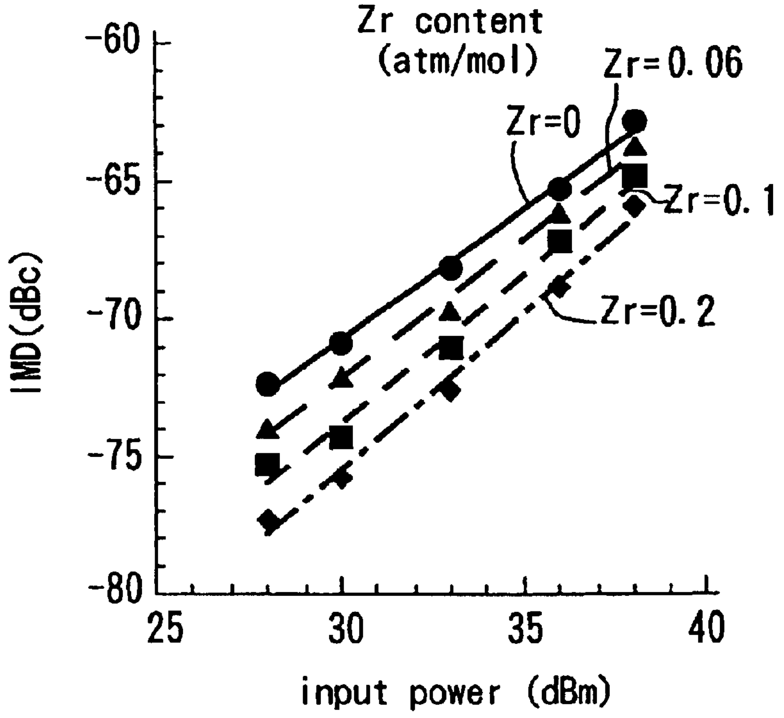
FIG. 4 is a graph showing the power dependence of an IMD of samples which employ different amounts of Zr used for substitution.

FIG. 4 is a graph showing the power dependence of IMD of each of the samples having different ΔHa terms. The IMD was measured through use of a lumped parameter isolator, by inputting the following signals:

a signal having an input frequency of 960 MHz; and another signal having an input frequency of 960.1 MHz. Input power is indicated as a value per wave. A sample having a smaller ΔHa term; that is, a sample having smaller crystalline magnetic anisotropy, caused a smaller IMD throughout a range of power. In other words, an increment ΔHa is changed by changing the material forming ferrimagnetic member and controlling the degree of magnetic anisotropy, to thereby enable control of the IMD.

As mentioned above, the IMD can be controlled by controlling the non-magnetic phase and magnetic anisotropy of ferrimagnetic material. In other words, the only requirement for reducing an IMD is that the FMR linewidth ΔH be reduced; namely, that non-magnetic phase or magnetic anisotropy of ferrimagnetic material be reduced.

Of the non-magnetic phase and magnetic anisotropy, both being relevant to a FMR linewidth, magnetic anisotropy is defined by properties of ferrimagnetic material. Accordingly, the FMR linewidth is controlled by changing composition of ferrimagnetic material, to thereby control an IMD.

Next will be described the composition of ferrimagnetic material suitable for suppressing generation of an IMD. Preferable ferrimagnetic material has a composition expressed by the following general formula:

$$(Y_{3-2x-z+w}Ca_{2X+Z})(Fe_{5-x-y-z-w}V_xAl_yZr_z)O_{12},$$

where, $0 \leqq x \leqq 0.7$, $0 \leqq y \leqq 0.7$, $0.05 \leqq z \leqq 0.3$, and $0.01 \leqq w \leqq 0.03$.

The ferrimagnetic material having the abovementioned composition has a FMR linewidth smaller than 15[Oe] and is effective for suppressing generation of an IMD. Further, the value of saturation magnetic flux density of the ferrimagnetic material can be adjusted, arbitrarily, and the ferrimagnetic material has a comparatively high curie point. Within the range where the FMR linewidth assumes a value smaller than 15[Oe], the IMD can be reduced to a value of −75 dBc or less, which practice poses no substantial problem at the time of use of an isolator.

The ferrimagnetic material having the above-mentioned composition according to the present invention can realize a balance between the curie point representing magnetic stability relative to temperature variation and the FMR linewidth and simultaneously satisfy practical requirements of the curie point and the FMR linewidth.

In the general formula, Zr has characteristics similar to those of In, and further, Zr is inexpensive or cheap than In. Elements V, Al, and Zr are substituted such that merits and demerits, which would be caused by substituting the elements, cancel each other, and hence, a loss characteristic and a temperature characteristic are set to preferable values.

Within the range of the "w" term of the above-mentioned chemical formula, there was obtained a compact crystal having only a garnet structure and a grain size of 15 μm or more. Outside the range of the "w" term of the abovementioned chemical formula, an inhomogeneous phase other than a garnet phase undesirably generates in a crystal.

The relationship between the amount of elements V, Al, and Zr which have been used as substitution elements and the saturation magnetic flux density 4πMs at room temperature can be readily estimated by the following empirical formula (±7% within the range of $0 \leqq z \leqq 0.3$).

$$4\pi Ms = 17801 - 1750x - 1400y + 1000z - 1200z^2$$

Thus, from the relationship between the amount of respective substitution element and the saturation magnetic flux density 4πMs, a material characteristic of a composition can be compared to that of other compositions having the same amount of saturation magnetic flux density to the composition. This will be described by reference to examples.

EXAMPLE 1

After having been sintered raw materials $Y_2O_3$, $CaCO_3$, $Fe_2O_3$, $ZrO_2$, $V_2O_5$, and $Al(OH)_3$ were weighed so as to assume a target composition $(Y_{3-2x-z+w}Ca_{2X+Z})(Fe_{5-x-y-z-w}V_xAl_yZr_z)O_{12}$. After having been wet-mixed by means of a ball mill for 20 hours, the materials were calcined at 1100 to 1200° C. for four (4) hours in the air. The thus-calcined materials were transferred to the ball mill and subjected to compression molding after having been subjected to wet grinding for 20 hours. The optimum temperature of the thus-obtained mold was selected from the range of 1250 to 1450° C. such that the FMR linewidth ΔH of the composition was minimized and a particle size of 15 μm or more was obtained. The mold was sintered for six (6) hours in oxygen. X-ray diffraction of the thus-obtained sintered compact (sintered material) indicates that the sintered compact has a garnet single phase.

Here, according to the Bond Method, a ball sample having a diameter of 1.0 mm (SAMPLE) was formed from a fragment sample of the sintered compact. Then, according to the Reflection Method, the FMR linewidth of the SAMPLE was determined at 10 GHz. Also, the saturation magnetic flux density and the curie temperature of the SAMPLE were determined through use of a Vibrating Magnetometer. Table 2 shows results (such as curie temperature and FMR linewidth) for the compositions computed through use of the above-mentioned empirical formula as to have a saturation magnetic flux density 4πMs of 1250 Gauss or thereabouts. In Table 2, Nos. 1 through 18 are assigned to the SAMPLE respectively used for determination. Here, "w" was set such that $0.01 \leqq w \leqq 0.03$.

TABLE 2

| No. | x | y | z | x + y | 4πMs [G] | Tc [° C.] | ΔH [Oe] |
|---|---|---|---|---|---|---|---|
| 1 | 0 | 0.38 | 0 | 0.38 | 1230 | 224 | 45 |
| 2 | 0.1 | 0.3 | 0.5 | 0.4 | 1280 | 62 | <15 |
| 3 | 0 | 0.5 | 0.4 | 0.5 | 1235 | 141 | <15 |
| 4 | 0.12 | 0.38 | 0.4 | 0.4 | 1230 | 148 | <15 |
| 5 | 0.24 | 0.25 | 0.4 | 0.49 | 1230 | 156 | <15 |
| 6 | 0.35 | 0.13 | 0.4 | 0.48 | 1219 | 163 | <15 |
| 7 | 0.47 | 0 | 0.4 | 0.47 | 1220 | 169 | <15 |
| 8 | 0.1 | 0.3 | 0.3 | 0.4 | 1220 | 180 | <15 |
| 9 | 0 | 0.44 | 0.2 | 0.44 | 1280 | 191 | <15 |
| 10 | 0.1 | 0.33 | 0.2 | 0.43 | 1286 | 199 | <15 |
| 11 | 0.21 | 0.22 | 0.2 | 0.43 | 1279 | 207 | <15 |
| 12 | 0.31 | 0.11 | 0.2 | 0.42 | 1275 | 217 | <15 |
| 13 | 0.42 | 0 | 0.2 | 0.42 | 1269 | 225 | <15 |
| 14 | 0 | 0.4 | 0.08 | 0.4 | 1250 | 223 | <15 |

TABLE 2-continued

| No. | x | y | z | x + y | 4πMs [G] | Tc [° C.] | ΔH [Oe] |
|---|---|---|---|---|---|---|---|
| 15 | 0.09 | 0.3 | 0.08 | 0.39 | 1238 | 233 | <15 |
| 16 | 0.19 | 0.2 | 0.08 | 0.39 | 1230 | 239 | <15 |
| 17 | 0.29 | 0.1 | 0.08 | 0.39 | 1215 | 252 | <15 |
| 18 | 0.38 | 0 | 0.08 | 0.38 | 1210 | 259 | <15 |

Material No. 1 is a conventional Y—Al—Fe garnet ferrite having a saturation magnetic flux density 4πMs of 1230 Gauss. Each of Materials Nos. 2 through 18 also has a saturation magnetic flux density 4πMs of 1250 Gauss or thereabouts (within the range of 1210 through 1286 Gauss).

With regard to FMR linewidth ΔHK which is relevant to an IMD, that of Material No. 1 has a value of 45[Oe], in contrast, that of each of Material Nos. 2 through 18 has a value smaller than 15[Oe]. Accordingly, with regard to an IMD, all Material Nos. 2 through 18 are improved as compared with conventional Material No. 1.

With regard to the curie temperature Tc, which is relevant to a temperature characteristic, that of Material No. 1 assumes a value of 224° C., in contrast, that of Material Nos. 8 through 18, each having a composition expressed by a general formula, assumes the range from 180° C. to 259° C. In comparison with conventional Material No. 1, it is seen that a composition—which suppresses an IMD expressed by a FMR linewidth and improves a temperature characteristic—satisfies the following requirements:

$0.09 \leqq z \leqq 0.2$;

$0 \leqq x \leqq 0.42$; and $0 \leqq y \leqq 0.44$.

Preferably, "x" and "y" are set such that (x+y) falls within the range of 0.3 to 0.44.

EXAMPLE 2

Regarding the sintered compact having a saturation magnetic flux density 4πMs of 1750 Gauss or thereabouts, the SAMPLE was made in the same manner as in Example 1. The characteristics of the SAMPLE were determined, and results are shown in Table 3. In Table 3, Material No. 21 designates a 'conventional' yttrium-iron garnet ferrite, which is non-substituted by Zr, (hereinafter called and also represented as 'Y—Fe garnet ferrite'), and Material Nos. 22 through 26 designate materials employed in Example 2.

With regard to the FMR linewidth ΔH, which is relevant to an IMD, that of Material No. 21 assumes a value of 25[Oe], in contrast, that of each of Material Nos. 22 through 26 assumes a value smaller than 15[Oe]. Accordingly, as compared with conventional Material No. 21, all Material Nos. 22 through 26 are improved in terms of an IMD.

With regard to the curie temperature, that of Material No. 21 assumes a value of 275° C., in contrast, that of each of Material Nos. 22 through 26 assumes a value lower than 275° C. Of Material Nos. 22 through 26, Material Nos. 22 and 26 have a curie temperature Tc of 261° C. and exhibit substantially the same temperature dependence as does Material No. 21.

In contrast with the case of conventional Material No. 21, the summary of the data provided in Table 3 shows that generation of an IMD is suppressed and an optimum composition capable of realizing equivalent temperature dependence satisfies the following requirements:

$z=0$;

$0 \leqq x \leqq 0.1$; and $0 \leqq y \leqq 0.1$.

Preferably, "x" and "y" are set such that (x+y) falls within the range of 0.05 to 0.06.

TABLE 3

| No. | x | y | z | x + y | 4πMs [G] | Tc [° C.] | ΔH [Oe] |
|---|---|---|---|---|---|---|---|
| 21 | 0 | 0 | 0 | 0 | 1780 | 275 | 25 |
| 22 | 0.05 | 0 | 0.1 | 0.05 | 1740 | 261 | <15 |
| 23 | 0.12 | 0 | 0.2 | 0.12 | 1700 | 238 | <15 |
| 24 | 0.14 | 0 | 0.3 | 0.14 | 1720 | 215 | <15 |
| 25 | 0.15 | 0 | 0.4 | 0.15 | 1715 | 196 | <15 |
| 26 | 0 | 0.06 | 0.1 | 0.06 | 1800 | 261 | <15 |

EXAMPLE 3

Regarding the sintered compact having a saturation magnetic flux density 4ρMs of 750 Gauss or thereabouts, the SAMPLE was made in the same manner as in Example 1. The characteristics of the SAMPLE were determined, and the results are shown in Table 4. Material No. 0.31 designates a conventional Y—Al—Fe garnet ferrite, which is a sample formed from material having a saturation magnetic flux density 4πMs of 750 Gauss. Material Nos. 32 through 43 are samples formed from materials having saturation magnetic flux densities 4πMs from 740 to 780 Gauss.

With regard to the FMR linewidth ΔH which is relevant to an IMD, that of Material No. 31 assumes a value of 30[Oe], in contrast, that of Material No. 33 and that of each of Material Nos. 38 through 43 assume a value smaller than 15[Oe].

With regard to the curie temperature Tc, that of Material No. 31 assumes a value of 175° C.; that of Material No. 34 assumes a value of 179° C.; and that each of Material Nos. 40 through 42 assumes a value higher than 175° C. and within the range of 177 to 196° C.

In contrast with conventional Material No. 31, materials having a saturation magnetic flux density 4πMs of 750 Gauss or thereabouts can suppress generation of an IMD and an equivalent or superior temperature characteristic, so long as the material satisfies the following requirements:

$0.2 \leqq z \leqq 0.3$;

$0.3 \leqq x \leqq 0.7$; and $0 \leqq y \leqq 0.42$.

Preferably, "x" and "y" are set such that (x+y) falls within the range of 0.70 to 0.75.

TABLE 4

| No. | x | y | z | x + y | 4πMs [G] | Tc [° C.] | ΔH [Oe] |
|---|---|---|---|---|---|---|---|
| 31 | 0 | 0.68 | 0 | 0.68 | 750 | 175 | 30 |
| 32 | 0.59 | 0 | 0 | 0.59 | 765 | 273 | 60 |
| 33 | 0 | 0.79 | 0.1 | 0.79 | 765 | 164 | <15 |
| 34 | 0.16 | 0.59 | 0.1 | 0.75 | 760 | 179 | 18 |
| 35 | 0.32 | 0.39 | 0.1 | 0.71 | 755 | 207 | 30 |
| 36 | 0.48 | 0.19 | 0.1 | 0.67 | 758 | 226 | 39 |
| 37 | 0.63 | 0 | 0.1 | 0.63 | 740 | 246 | 45 |
| 38 | 0 | 0.84 | 0.2 | 0.84 | 760 | 135 | <15 |
| 39 | 0.17 | 0.63 | 0.2 | 0.80 | 770 | 155 | <15 |
| 40 | 0.33 | 0.42 | 0.2 | 0.75 | 780 | 177 | <15 |
| 41 | 0.5 | 0.21 | 0.2 | 0.71 | 775 | 196 | <15 |
| 42 | 0.70 | 0 | 0.3 | 0.70 | 740 | 188 | <15 |
| 43 | 0.71 | 0 | 0.4 | 0.71 | 752 | 159 | <15 |

EXAMPLE 4

Next will be described an application example in which ferrimagnetic material having a composition of $(Y_{2.58}Ca_{0.46})(Fe_{4.49}V_{0.19}Zr_{0.08}Al_{0.2})O_{12}$ (x=0.19, y=0.2, z=0.08, and w=0.02) was used for an isolator. To put it more concretely, in the application example, the ferrimagnetic member applied the isolator is formed from the ferrimagnetic material. Here, the ferrimagnetic material has the following properties:

a saturation magnetic flux density of 1230 Gauss;

a curie temperature of 239° C.; and a FMR linewidth smaller than 15[Oe].

A ferrimagnetic member was formed from the ferrimagnetic material (FM-MEMBER A), and then, a 1.9-GHz distributed parameter isolator was fabricated using the FM-MEMBER A (hereinafter called 'ISOLATOR A'). In other words, ISOLATOR A is one example of the present invention.

While, for comparison, another ferrimagnetic member was formed from conventional Y—Al—Fe garnet ferrite (FM-MEMBER B), and then, another isolator was fabricated using the FM-MEMBER B (hereinafter called 'ISOLATOR B'). In other words, ISOLATOR B is one example of the prior arts.

Here, the Y—Al—Fe garnet ferrite has the following properties:

a saturation magnetic flux density of 1250 Gauss;

a curie temperature of 240° C.; and a FMR linewidth of 45[Oe] or less.

Figure 5:
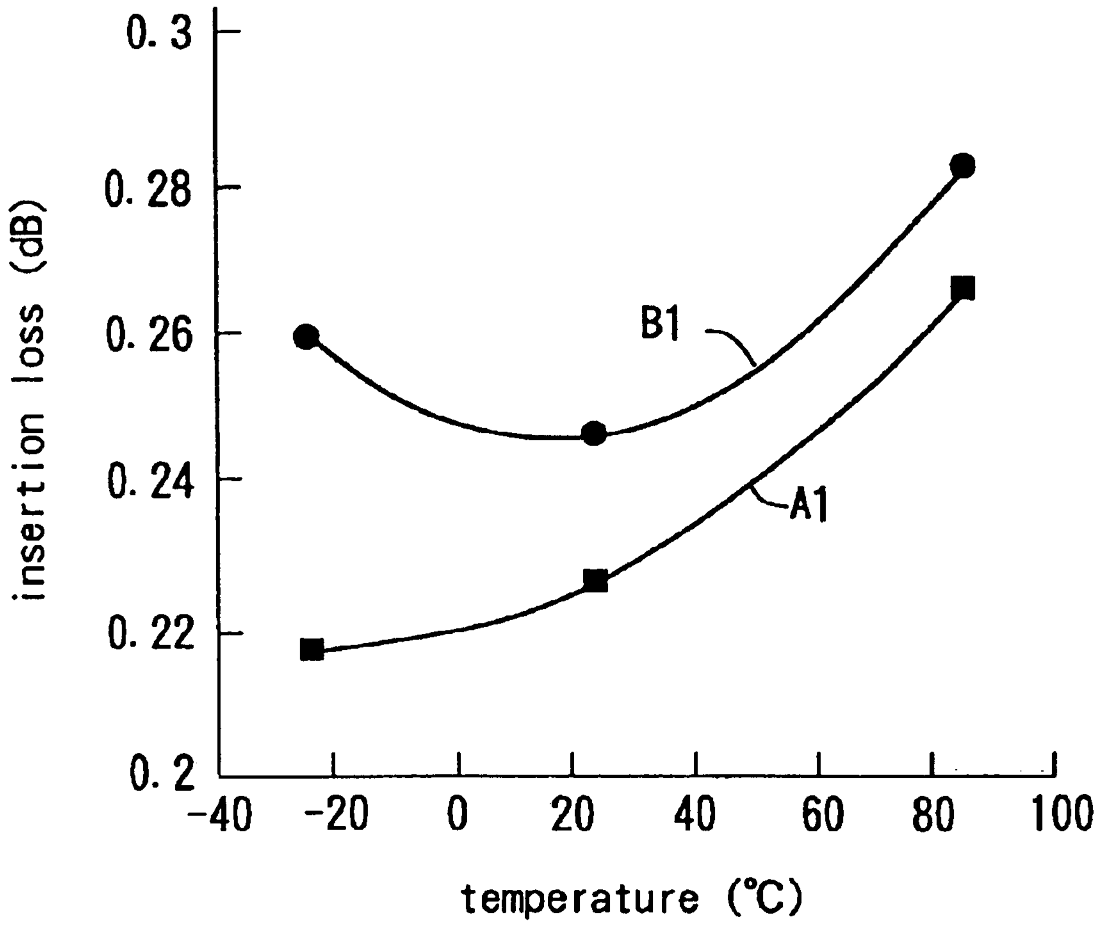
FIG. 5 shows data representing the relationship between variation in the temperature of an isolator and an insertion loss.

FIG. 5 shows the relationship between temperature variation and insertion loss for ISOLATOR A and ISOLATOR B. Curves A1 and B1 show the insertion losses of the ISOLATOR A and the ISOLATOR B respectively.

As is evident from FIG. 5, the insertion loss of the ISOLATOR A is smaller than that of the ISOLATOR B at any given temperature within the temperature range shown, wherewith the ISOLATOR A shows a superior temperature characteristic.

Figure 6:
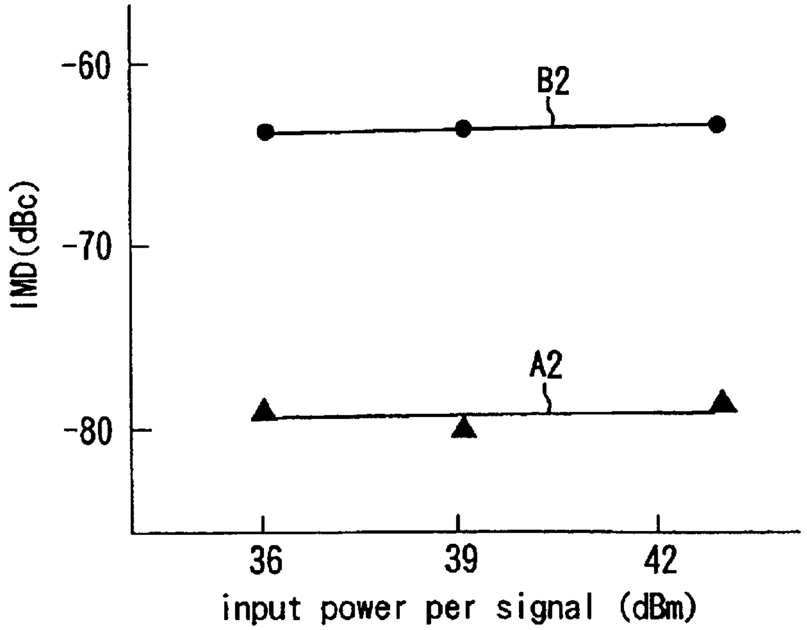
FIG. 6 is a graph showing the power dependence of an IMD of an isolator.

FIG. 6 shows the relationship between an IMD and input power per signal for ISOLATOR A and ISOLATOR B. Curves A2 and B2 show the IMD characteristics of the ISOLATOR A and the ISOLATOR B respectively.

As is evident from FIG. 6, on condition that the same input power is available, the IMD of the ISOLATOR A is smaller than that of the ISOLATOR B by 17[dBc] to 18[dBc]. Further, the IMD of the ISOLATOR A is suppressed to a considerably low value of about −80[dBc].

EXAMPLE 5

Next will be described an application example in which ferrimagnetic material having a composition of $(Y_{0.82}Ca_{0.2})(Fe_{4.83}V_{0.05}Zr_{0.1})O_{12}$ (x=0.05, y=0, z=0.1, and w=0.02) was used for an isolator. To put it more concretely, in the application example, the ferrimagnetic member applied the isolator is formed from the ferrimagnetic material. Here, the ferrimagnetic material has the following properties:

a saturation magnetic flux density of 1740 Gauss;

a curie temperature of 260° C.; and a FMR linewidth smaller than 15[Oe].

A ferrimagnetic member was formed from the ferrimagnetic material (FEM-MEMBER C), and then, a 2.0-GHz distributed parameter isolator was fabricated using the FM-MEMBER C (hereinafter called 'ISOLATOR C'). In other words, ISOLATOR C is also one example of the present invention.

While, for comparison, another ferrimagnetic member was formed from conventional Y—Fe garnet ferrite, which is non-substituted (FM-MEMBER D), and then, another isolator was fabricated using the FM-MEMBER D (hereinafter called 'ISOLATOR D'). In other words, ISOLATOR C is also one example of the prior arts. Here, the Y—Fe garnet ferrite has the following properties:

a saturation magnetic flux density of 1770 Gauss;

a curie temperature of 287° C.; and a FMR linewidth of 23[Oe].

Figure 7:
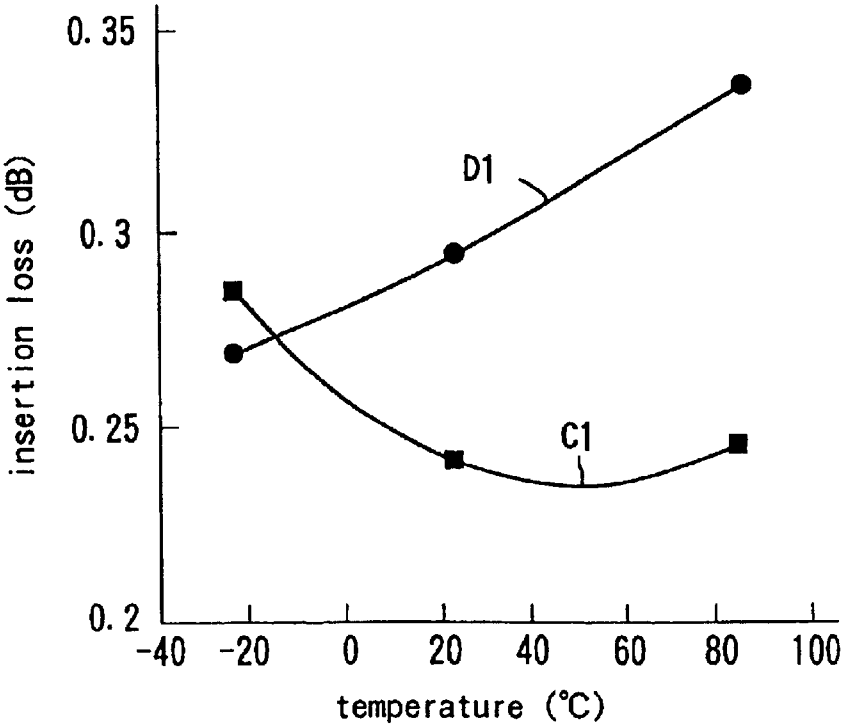
FIG. 7 shows data representing the relationship between variation in the temperature of an isolator and an insertion loss.

FIG. 7 shows the relationship between temperature variation and insertion loss for the ISOLATOR C and the ISOLATOR D. Curves C1 and D1 show the insertion losses of the ISOLATOR C and the ISOLATOR D respectively.

As is evident from FIG. 7, the insertion loss of the ISOLATOR C is smaller than that of the ISOLATOR D at any temperature of −20° C. or more, wherewith the ISOLATOR C shows a superior temperature characteristic.

Figure 8:
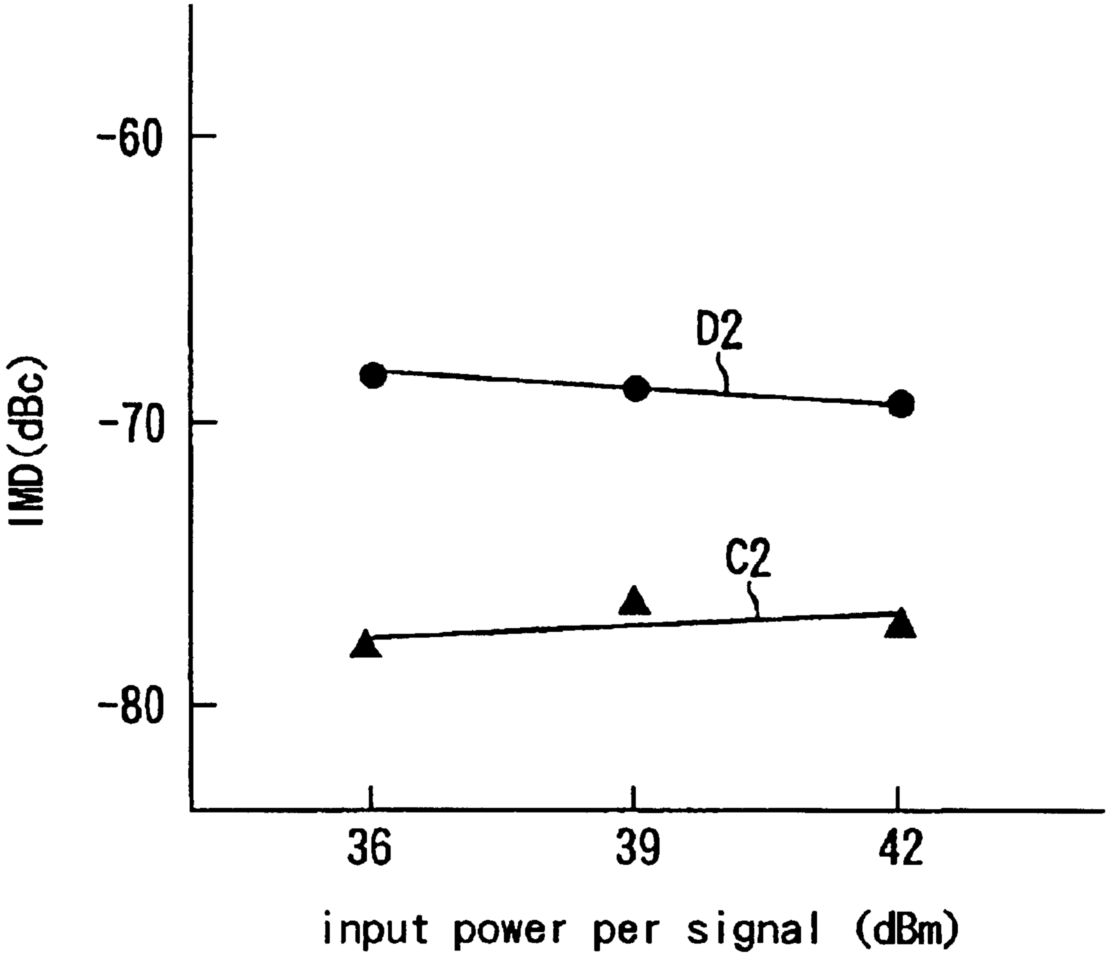
FIG. 8 is another graph showing the power dependence of an IMD of an isolator.

FIG. 8 shows the relationship between an IMD and input power per signal for the ISOLATOR C and the ISOLATOR D. Curves C2 and D2 show the IMD characteristics of the ISOLATOR C and the ISOLATOR D, respectively.

As is evident from FIG. 8, on condition that the same input power is available, the IMD of the ISOLATOR C is smaller than that of the ISOLATOR D by 8[dBc] to 10[dBc]. Further, the IMD of the ISOLATOR C is suppressed to a considerably low value of about −76[dBc] to −78[dBc].

Figure 9:
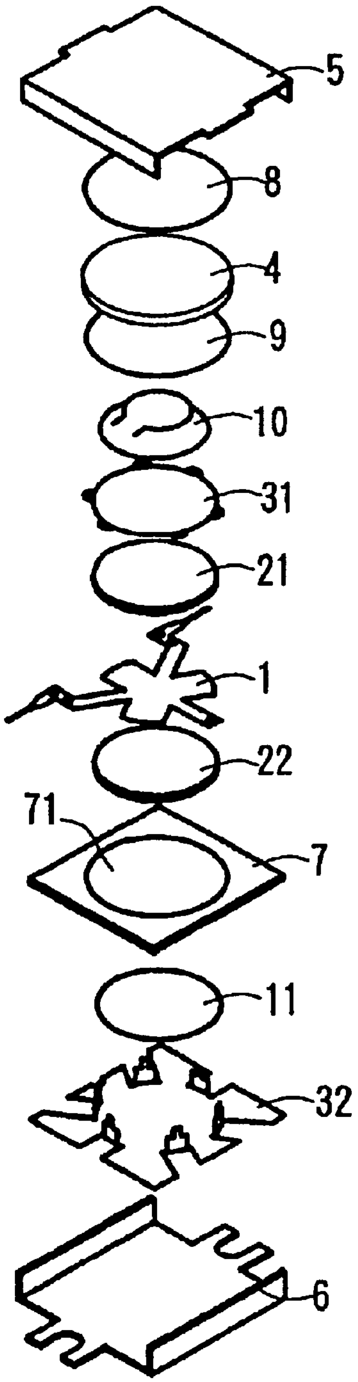
FIG. 9 is an exploded perspective view showing a non-reciprocal device according to the present invention.
Figure 10:
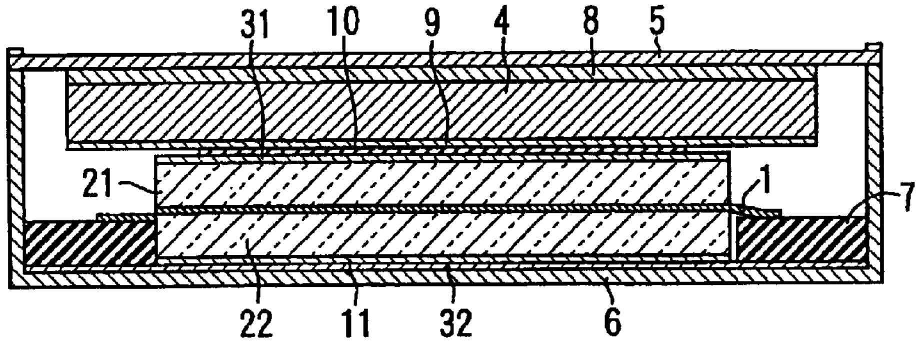
FIG. 10 is a cross-sectional view of the non-reciprocal device shown in FIG. 9.

FIG. 9 is an exploded perspective view showing a non-reciprocal device, and FIG. 10 is a cross-sectional view showing the non-reciprocal device shown in FIG. 9. The illustrated non-reciprocal device is a distributed parameter isolator and comprises:

a center conductor 1 made of a strip conductor, a magnet 4; and ferrimagnetic members 21 and 22 formed from the ferrimagnetic material according to the present invention.

In FIG. 9 or 10, one of the ferrimagnetic members 21 and 22 is placed on the center conductor 1, and the other ferrimagnetic member is placed below the center conductor 1. While, there may be employed a single ferrimagnetic member, which would be placed on either side of the center conductor 1.

The magnet 4 applies a d.c. magnetic field to the ferrimagnetic members 21 and 22 and the center conductor 1. While, there may be employed two magnets 4, which would be placed on the respective sides of the ferrimagnetic members 21 and 22. Yokes 5 and 6 are magnetically connected to the magnet 4. In the illustrated example, the yokes 5 and 6 double as a package case for covering the ferrimagnetic member 21 and 22, the center conductor 1, ground conductors 31 and 32, and the magnet 4.

A substrate 7 of the distributed parameter isolator is equipped with capacitors and resistors required for effecting the operation of the non-reciprocal device. There is formed an aperture 71 in the substrate 7, and the ferrimagnetic member 22 is disposed within the aperture 71. Here, reference numerals 8, 9, 10 and 11 designate as follows respectively:

8: magnetic shunt plate;

9, 11: magnetic plates; and

10: spacer.

The present example shows a distributed parameter non-reciprocal circuit. However, a lumped parameter isolator or a substrate-type non-reciprocal device may also be adopted. The specific configuration of a lumped parameter isolator and that of a substrate-type non-reciprocal device are obvious to a person skilled in the art.

Figure 11:
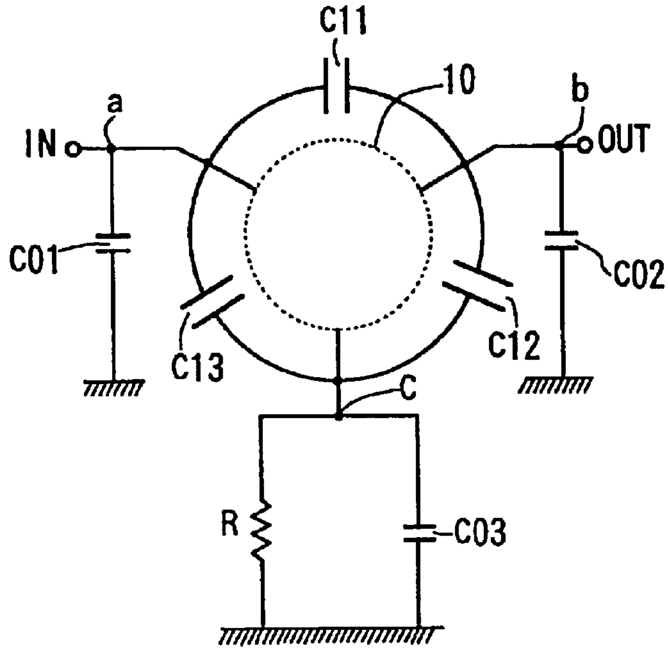
FIG. 11 is an equivalent circuit diagram of the isolator shown in FIG. 9 or 10, as one example of the non-reciprocal devices, when the isolator is used.

FIG. 11 shows an equivalent circuit diagram of the non-reciprocal device when an isolator shown in FIG. 9 or 10 is used. In the FIG. 11, an inter-terminal capacitor C11 is connected across terminals “a” and “b”;

an inter-terminal capacitor C12 is connected across terminals “b” and “c”; and an inter-terminal capacitor C13 is connected across terminals “c” and “a.”

Further, also, a ground capacitor C01 is connected to the terminal “a”;

a ground capacitor C02 is connected to the terminal “b”; and a ground capacitor C03 is connected to the terminal “c.”

The non-reciprocal device shown in FIGS. 9 through 11 is a mere example non-reciprocal device applicable to the present invention. The present invention is applicable to various types of non-reciprocal devices; that is, isolators or circulators, wherewith an IMD of the non-reciprocal device can be reduced and the temperature characteristic of the same can be improved.

INDUSTRIAL APPLICABILITY

As mentioned above, the present invention yields the following advantages:

(a) The present invention can provide— a control method which enables suppression of an intermodulation distortion to a small value even when a sufficient d.c. magnetic field cannot be applied to ferrimagnetic member;

ferrimagnetic material forming the ferrimagnetic member suitable for implementing the control method; and a non-reciprocal device using the ferrimagnetic material.

(b) The present invention can provide— an intermodulation distortion control method effective for rendering a non-reciprocal device compact and thin;

ferrimagnetic material forming the ferrimagnetic member suitable for implementing the intermodulation distortion control method; and a non-reciprocal device using the ferrimagnetic material.

(c) The present invention can provide— low-cost ferrimagnetic material having a superior temperature characteristic; and a low-cost non-reciprocal device having a superior temperature characteristic.

What is claimed is:

1. A ferrimagnetic material, having:

a composition expressed by a general formula $(Y_{3-2x-z+w}Ca_{2X+Z})(Fe_{5-x-y-z-w}V_xAl_yZr_z)O_{12}$ and satisfies the following requirements;

$0 \leqq x \leqq 0.7$, $0 \leqq y \leqq 0.7$, $0.05 \leqq z \leqq 0.4$, and $0.01 \leqq w \leqq 0.03$.

2. A ferrimagnetic material as defined in claim 1, wherein, in a case where a saturation magnetic flux density assumes a value of 1250 Gauss or thereabouts, the ferrimagnetic material satisfies the following requirements;

$0 \leqq x \leqq 0.42$, $0 \leqq y \leqq 0.44$, and $0.08 \leqq z \leqq 0.2$.

3. A ferrimagnetic material as defined in claim 1, wherein, in a case where a saturation magnetic flux density assumes a value of 1750 Gauss or thereabouts, the ferrimagnetic material satisfies the following requirements;

$0 \leqq x \leqq 0.1$, $0 \leqq y \leqq 0.1$, and $z=0.1$.

4. A ferrimagnetic material as defined in claim 1, wherein in a case where a saturation magnetic flux density assumes a value of 750 Gauss or thereabouts, the ferrimagnetic material satisfies the following requirements;

$0.3 \leqq x \leqq 0.7$, $0 \leqq y \leqq 0.42$, and $0.2 \leqq z \leqq 0.3$.

5. A ferrimagnetic material as defined in claim 1, wherein a ferromagnetic resonance linewidth of the ferrimagnetic material is set to a value smaller than 15[Oe].

6. A ferrimagnetic material, comprising:

Y, Ca, Fe, V, Al, Zr and O wherein, the Y, the Ca, the Fe, the V, the Al, the Zr and the O satisfy the following formula:

$(Y_{3-2x-z+w}Ca_{2X+Z})(Fe_{5-x-y-z-w}V_xAl_yZr_z)O_{12}$ ($0 \leqq x \leqq 0.7$, $0 \leqq y \leqq 0.7$, $0.05 \leqq z \leqq 0.4$, and $0.01 \leqq w \leqq 0.03$).

7. A ferrimagnetic material as defined in claim 6, wherein, a ferromagnetic resonance linewidth of the ferrimagnetic material is set to a value smaller than 15[Oe].

8. A ferrimagnetic material, comprising:

Y, Ca, Fe, V, Al, Zr and O wherein, the Y, the Ca, the Fe, the V, the Al, the Zr and the O satisfy the following formula:

$(Y_{3-2x-z+w}Ca_{2X+Z})(Fe_{5-x-y-z-w}V_xAl_yZr_z)O_{12}$ ($0 \leqq x \leqq 0.42$, $0 \leqq y \leqq 0.44$, $0.0823 \leqq z \leqq 0.2$, and $0.01 \leqq w \leqq 0.03$).

9. A ferrimagnetic material as defined in claim 8, wherein, a ferromagnetic resonance linewidth of the ferrimagnetic material is set to a value smaller than 15[Oe].

10. A ferrimagnetic material, comprising:

Y, Ca, Fe, V, Al, Zr and O wherein, the Y, the Ca, the Fe, the V, the Al, the Zr and the O satisfy the following formula:

$(Y_{3-2x-z+w}Ca_{2X+Z})(Fe_{5-x-y-z-w}V_xAl_yZr_z)O_{12}$ ($0 \leqq x \leqq 0.1$, $0 \leqq y \leqq 0.1$, $z=0.1$, and $0.01 \leqq w \leqq 0.03$).

11. A ferrimagnetic material as defined in claim 10, wherein, a ferromagnetic resonance linewidth of the ferrimagnetic material is set to a value smaller than 15[Oe].

12. A ferrimagnetic material, comprising:

Y, Ca, Fe, V, Al, Zr and O wherein, the Y, the Ca, the Fe, the V, the Al, the Zr and the O satisfy the following formula:

$(Y_{3-2x-z+w}Ca_{2X+Z})(Fe_{5-x-y-z-w}V_xAl_yZr_z)O_{12}$ ($0.3 \leqq x \leqq 0.7$, $0 \leqq y \leqq 0.42$, $0.2 \leqq z \leqq 0.3$, and $0.01 \leqq w \leqq 0.03$).

13. A ferrimagnetic material as defined in claim 12, wherein, a ferromagnetic resonance linewidth of the ferrimagnetic material is set to a value smaller than 15[Oe].

14. A non-reciprocal device, comprising:

at least one ferrimagnetic member made of a ferrimagnetic material, wherein the ferrimagnetic material has a composition expressed by a general formula $(Y_{3-2x-z+w}Ca_{2X+Z})(Fe_{5-x-y-z-w}V_xAl_yZr_z)O_{12}$ and satisfies the following requirements;

$0 \leqq x \leqq 0.7$, $0 \leqq y \leqq 0.7$, $0.05 \leqq z \leqq 0.4$, and $0.01 \leqq w \leqq 0.03$;

a center conductor disposed opposite the ferrimagnetic member; and at least one magnet applying a direct current magnetic field to the center conductor and the ferrimagnetic member.

15. A non-reciprocal device as defined in claim 14, wherein, in a case where a saturation magnetic flux density assumes a value of 1250 Gauss or thereabouts, the ferrimagnetic material satisfies the following requirements;

$0 \leqq x \leqq 0.42$, $0 \leqq y \leqq 0.44$, and $0.08 \leqq z \leqq 0.2$.

16. A non-reciprocal device as defined in claim 14, wherein, in a case where a saturation magnetic flux density assumes a value of 1750 Gauss or thereabouts, the ferrimagnetic material satisfies the following requirements;

$0 \leqq x \leqq 0.1$, $0 \leqq y \leqq 0.1$, and $z=0.1$.

17. A non-reciprocal device as defined in claim 14, wherein, in a case where a saturation magnetic flux density assumes a value of 750 Gauss or thereabouts, the ferrimagnetic material satisfies the following requirements;

$0.3 \leqq x \leqq 0.7$, $0 \leqq y \leqq 0.42$, and $0.2 \leqq z \leqq 0.3$.

18. A non-reciprocal device as defined in claim 14, wherein a ferromagnetic resonance linewidth of the ferrimagnetic material is set to a value smaller than 15[Oe].

19. A non-reciprocal device as defined in claim 14, wherein the intermodulation distortion of the non-reciprocal device assumes a value of −75 dBc or less.

20. A non-reciprocal device as defined in claim 14, wherein the non-reciprocal device is distributed parameter type.

21. A non-reciprocal device as defined in claim 14, wherein the non-reciprocal device is lumped parameter type.

22. A non-reciprocal device as defined in claim 14, wherein the non-reciprocal device is substrate type.

23. A method of controlling an intermodulation distortion of a non-reciprocal device having at least one ferrimagnetic member formed of a ferrimagnetic material comprising the step of:

controlling the intermodulation distortion by controlling a ferromagnetic resonance linewidth of the ferrimagnetic material, wherein the ferromagnetic resonance linewidth is controlled by making a composition of the ferrimagnetic material up of the following general formula:

$(Y_{3-2x-z+w}Ca_{2X+Z})(Fe_{5-x-y-z-w}V_xAl_yZr_z)O_{12}$ ($0 \leqq x \leqq 0.7$, $0 \leqq y \leqq 0.7$, $0.05 \leqq z \leqq 0.4$, and $0.01 \leqq w \leqq 0.03$).

24. A method of controlling an intermodulation distortion of a non-reciprocal device having at least one ferrimagnetic member formed of a ferrimagnetic material, comprising the step of:

controlling the intermodulation distortion by controlling a ferromagnetic resonance linewidth of the ferrimagnetic material, wherein the ferromagnetic resonance linewidth is controlled by making a composition of the ferrimagnetic material up of the following general formula:

$(Y_{3-2x-z+w}Ca_{2X+Z})(Fe_{5-x-y-z-w}V_xAl_yZr_z)O_{12}$ ($0 \leqq x \leqq 0.42$, $0 \leqq y \leqq 0.44$, $0.08 \leqq z \leqq 0.2$, and $0.01 \leqq w \leqq 0.03$) when a saturation magnetic flux density assumes a value of 1250 Gauss or thereabouts.

25. A method of controlling an intermodulation distortion of a non-reciprocal device having at least one ferrimagnetic member formed of a ferrimagnetic material, comprising the step of:

controlling the intermodulation distortion by controlling a ferromagnetic resonance linewidth of the ferrimagnetic material, wherein the ferromagnetic resonance linewidth is controlled by making a composition of the ferrimagnetic material up of the following general formula:

$(Y_{3-2x-z+w}Ca_{2X+Z})(Fe_{5-x-y-z-w}V_xAl_yZr_z)O_{12}$ ($0 \leqq x \leqq 0.1$, $0 \leqq y \leqq 0.1$, $z=0.1$, and $0.01 \leqq w \leqq 0.03$) when a saturation magnetic flux density assumes a value of 1750 Gauss' or thereabouts.

26. A method of controlling an intermodulation distortion of a non-reciprocal device having at least one ferrimagnetic member formed of a ferrimagnetic material, comprising the step of:

controlling the intermodulation distortion by controlling a ferromagnetic resonance linewidth of the ferrimagnetic material, wherein the ferromagnetic resonance linewidth is controlled by making a composition of the ferrimagnetic material up of the following general formula:

$(Y_{3-2x-z+w}Ca_{2X+Z})(Fe_{5-x-y-z-w}V_xAl_yZr_z)O_{12}$ ($0.3 \leqq x \leqq 0.7$, $0 \leqq y \leqq 0.42$, $0.2 \leqq z \leqq 0.3$, and $0.01 \leqq w \leqq 0.03$) when a saturation magnetic flux density assumes a value of 750 Gauss or thereabouts.

* * * * *

UNITED STATES PATENT AND TRADEMARK OFFICE
CERTIFICATE OF CORRECTION

PATENT NO. : 6,933,799 B1
DATED : August 23, 2005
INVENTOR(S) : Nukaga et al.

It is certified that error appears in the above-identified patent and that said Letters Patent is hereby corrected as shown below:

Title page,
Item [63], Related U.S. Application Data, should read:
-- [63] Continuation of application No. PCT/JP99/01996, filed on April 14, 1999. --.

Signed and Sealed this

Twenty-second Day of November, 2005

JON W. DUDAS
*Director of the United States Patent and Trademark Office*